United States Patent [19]

Beers et al.

[11] 3,735,363

[45] May 22, 1973

[54] INFORMATION PROCESSING SYSTEM EMPLOYING STORED MICROPROGRAMMED PROCESSORS AND ACCESS FREE FIELD MEMORIES

[75] Inventors: Leroy Walter Beers, Exton; Alfred John DeSantis, Norristown, both of Pa.

[73] Assignee: Burroughs Corporation, Detroit, Mich.

[22] Filed: Apr. 7, 1971

[21] Appl. No.: 131,889

[52] U.S. Cl. ............ 340/172.5

[51] Int. Cl. ............ G06f 9/16

[58] Field of Search ............ 340/172.5

[56] References Cited

UNITED STATES PATENTS

| | | | |
|---|---|---|---|
| 3,579,192 | 5/1971 | Rasche | 340/172.5 |
| 3,599,176 | 8/1971 | Cordero | 340/172.5 |
| 3,546,677 | 12/1970 | Barton | 340/172.5 |
| 3,544,969 | 12/1970 | Rakoczi | 340/172.5 |
| 3,404,378 | 10/1968 | Threadgold | 340/172.5 |
| 3,444,527 | 5/1969 | Hartley | 340/172.5 |
| 3,374,466 | 3/1968 | Hanf | 340/172.5 |
| 3,315,235 | 4/1967 | Carnevale | 340/172.5 |

*Primary Examiner*—Paul J. Henon
*Assistant Examiner*—Sydney R. Chirlin
*Attorney*—Charles S. Hall, Meryn L. Young and Paul W. Fish

[57] ABSTRACT

This disclosure relates to an information processing system having a free field storage array to accomodate operands and data segments of any size and format and also employing processors wherein program instructions are executed through the implementation of strings of micro instructions which are also initially stored in the main memory and fetched therefrom when required for the implementation of a program instruction. Each processor is provided with a program buffer to hold those micro instructions required for immediate execution and also with a second buffer that may be used as though it were a fixed set of registers in the form of a read only memory to hold those micro instructions required for the fetching of new strings of micro instructions. Processors are also provided with subroutine return stacks and local data storage registers. While each of the main memory units are, in fact, structure oriented, such storage units are provided with isolation units having the capability of extracting and inserting fields of information independent of the memory structure. In this manner, the processing system is not limited to the implementation of only a few specific program languages having particular data formats and algorithimic operations.

19 Claims, 14 Drawing Figures

Fig. I

INVENTORS
LEROY W. BEERS
ALFRED J. DESANTIS
BY
ATTORNEY

INFORMATION PROCESSING SYSTEM EMPLOYING STORED MICROPROGRAMMED PROCESSORS AND ACCESS FREE FIELD MEMORIES

This invention relates to an information processing system that is provided with a free field storage or memory unit, and more particularly to such a system having stored or variably microprogrammed processors to access free field memories.

BACKGROUND OF THE INVENTION

A particular architectural concept that allowed for more flexibility in computer design and also in computer programming has been the concept of microprograms or microinstructions. Initially, a microinstruction was merely a set of control bits employed within a macroinstruction format, such control bits were employed to provide corrective measures during the execution of a multiply instruction or shift instruction and the like. This concept then evolved to where the macroinstruction specified the particular routine to be performed, such as the addition of two operands, and the execution of the macroinstructions was through a sequence of executions of microinstructions each of which specified the particular gates to be set at the different sequence times. Since a plurality of macroinstructions could be implemented by a finite set of microinstructions, it was recognized that these same microinstructions could be stored in a separate storage to be addressed in any particular sequence upon the execution of different macroinstructions. It was further recognized that various sequences of microinstructions could be formulated to carry out particular operations and separately stored in any memory. Thus, a great variety of sequences of microinstructions could be created to carry out a great variety of routines, and, when a given computer system was designed to perform particular routines, only those required sequences of microinstructions could be stored to be called forth for execution upon the execution of specific individual macroinstructions.

The concept of microinstruction or microprograms, then, became one of sub-instructional sets which were masked or hidden from the programmer thus simplifying the writing of particular programs by minimizing the number of individual specific steps that had to be called for by the programmer. The concept of microprogramming allowed the computer designer to design a more inexpensive computer system that could provide a great variety of routines to the computer user without the requirement of individual functions being implemented in hard-wired circuitry.

Various programming languages or source languages have been devised which allow the user to write programs without specific knowledge of the machine language which the system employs. Among the various programming languages which have been devised are Fortran, Cobol, Algol and PL/1. A particular problem in devising compilers or translators for the source languages is that of a difference not only in the type of operators to be employed but also in their instruction formats as well as in the data structures involved. Such structural format differences and operator requirements occur in part because of the different memory organizations that are designed for different processing systems. Thus, if one system were particularly adaptable for employing a particular programming language, it would not necessarily be as readily adaptable for another programming language. Therefore, it would be desirable to have a memory organization which is free of any internal structure and which can accommodate data and instruction segments of an almost infinite variety of sizes. Not only does such a structure free memory accommodate different sized information segments, but it also allows for greater data compaction.

It is impractical to build a completely bit addressable memory, and memories are designed to be word or byte oriented. Prior art memories have been designed to be able to store and fetch to or from any selected byte location in a word oriented memory. However, this still does not allow for selection of a field of any size larger or smaller than a byte, which field can start at any selected bit location. This is particularly advantageous in accommodating different problem solutions for which various program languages and data formats have been designed.

It is therefore an object of the present invention to provide an improved information processing system, the memory and processor structure of which does not restrict its usage.

It is still another object of the present invention to provide an improved information processing system that can handle complex data structures which may be both nested and composed of variable type and length elements.

It is still another object of the present invention to provide an information processing system that may readily accommodate the sophisticated program structures dictated by present and future source languages.

RELATED U.S. PATENT APPLICATIONS

U.S. Patent applications directly or indirectly related to the subject application are the following:

Ser. No. 880,535 filed Nov. 28, 1969 now U.S. Pat. No. 3,680,058 by A. J. DeSantis, et al. and titled "Information Processing System Having Free Field Storage For Nested Process;"

Ser. No. 880,537 filed Nov. 28, 1969 now U.S. Pat. No. 3,654,621 by R. V. Bock, et al. and titled "Information Processing System Having Means For Dynamic Memory Address Preparation."

SUMMARY OF THE INVENTION

In order to provide a processing system that will accommodate various higher level languages and also readily emulate other processing systems, the processing system of the present invention is provided with a free field memory in which may be stored segments of any specified number of bits starting at any particular bit location within the memory, and also one or more processors wherein program instructions are implemented through the execution of strings of micro instruction which are initially stored in main memory and then fetched therefrom as required to implement particular program instructions. Since it is impractical to build bit addressable memory, the memories are in fact structure oriented and are provided with isolating units that are adapted to fetch contiguous pairs of words from the memory and to insert or extract therefrom segments of any specified number of bits. The processor is provided with a program buffer to hold those micro instructions required for the immediate execution of a program instruction and also with a fixed set of registers or read only local memory to hold those micro instructions which are employed to fetch new strings of micro instruction. Thus, when it is required to execute a program instruction or a routine specifying instruction, those strings of micro instructions required to carry out that program instruction are fetched from main memory and placed in the local program buffer. When the micro instructions in the local program buffer have been exhausted, new strings of micro instructions will be fetched if required or a new program instruction will be fetched for interpretation through the execution of new strings of micro instructions.

A feature, then, of the present invention resides in an information processing system having one or more structure oriented memories and an isolating unit to store or fetch therefrom instructions and data segments of any specified number of bits which instructions and segments may be stored in the respective memories starting at any particular bit location which instructions are implemented in processors of said system through the execution of strings of micro instructions.

Another feature of the present invention resides in the processor of such a system which is provided with a local program buffer to hold those micro instructions required for the immediate execution of a program instruction and also is provided with a fixed set of registers to hold those micro instructions required for the fetching of new strings of micro instructions.

Still another feature of the present invention resides in the provision within the processors of local data storage to hold operands required for instructions that are to be executed.

A further feature of the present invention resides in the provision within the processors of subroutine-return stacks to hold the address of a return microinstruction as required to exit from a subroutine or micro instruction branch.

DESCRIPTION OF THE DRAWINGS

The above and other objects, advantages and features will become more readily apparent from a review of the following description in relation with the drawings wherein.

GENERAL DESCRIPTION OF THE SYSTEM

Multiprocessing systems, as well as multiprogramming systems, can be viewed as a series of related or unrelated programs, tasks or jobs which hereinafter will be called processes. An elementary process is a serial execution of operators by a single processor. A process may be partitioned into subprocesses or may be part of a parent process. In this way a process hierarchy can be established. The term "process" may be defined as an association between a processor and address space. The address space is the set of all storage that is acceptable by that process. All the available storage space in the system can be viewed as holding a global process which is the ancestor of all other processes and subprocesses in the system. Such a global process can be viewed as including the entire operating system with supervisory programs, service programs and compilers as well as the various user programs.

The address space of the system of the present invention extends over all the levels of storage including the main store and a back up store as well as peripheral devices. This system, of course, may be provided with a plurality of processors each of which is provided with a resource structure in memory to store the definition of a new work space or spaces. This resource structure permits each processor to keep track of the relation between the entire global process space (the memory or storage) and the particular process space with which it is currently associated.

As a particular processor moves from a parent process to a subprocess, allocated resources are staked in the processor's resource structure and are removed from the process resource structure when the processor moves from the subprocess back to the parent process. In this way, the resource structure contains all of the dynamically allocated resources which its processor might require for any particular subprocess. A particular system management process is the only process which may directly access entries into each of the resource structures.

Figure 1:
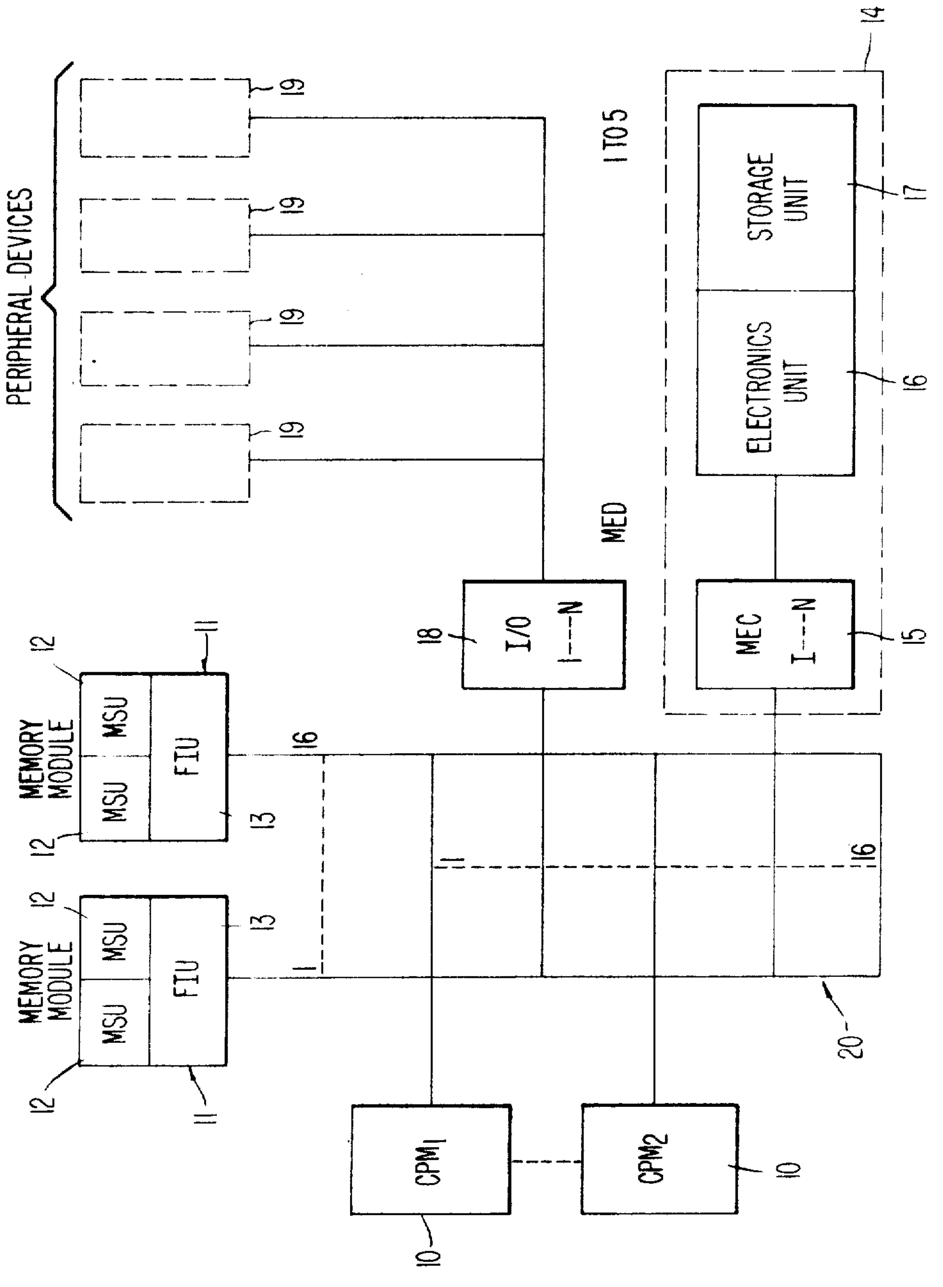
FIG. 1 is a schematic representation of a system of the type employing the present invention.

By generally describing the process architecture in the manner above, one has also generally described the manner in which the various levels of storage are employed. A brief description will now be given of the system of the present invention adapted to utilize such process architecture. Referring now to FIG. 1, there is shown therein a general representation of the type of system embodying the present invention. This system includes a plurality of central processor modules 10 (which are interpretive in nature) and one or more I/O control modules 18 which along with back up memory 14 are connected to a plurality of memory modules 11 by way of a switch interlock 20. Each of the memory modules 11 is comprised of two memory storage units 12 and an isolation unit 13 the function of which will be more thoroughly described below. Back up memory 14 is comprised of memory extension controller 15 and a plurality of units 16 and 17 which may include registers, core storage or disc files. Back up memory 14 will hereinafter be referred to as level 2 memory. One or more of the I/O controllers 18 are employed to establish communication to the plurality of peripheral devices 19.

The organization as illustrated in FIG. 1 does not differ substantially from that disclosed in Lynch et al. U.S. Pat. No. 3,411,139. However, the system of the present invention does distinguish quite differently therefrom in the manner in which it employs the process hierarchy described above and in the manner in which the features of the present invention are adapted to employ that hierarchy.

The principle features of the present invention reside both in the manner in which the respective memory modules 12 are adapted to appear to the system as free field storage and in the manner in which the respective processors 10 are adapted to interpret programs written in various high level languages and also to handle the transfer to the various data structures required by such programs or processes. Both the interpretation and the data handling including memory addressing is controlled by strings of micro instructions which are themselves stored in the main memory and transferred to local storage within the processor or interpreter as required.

All of the normal instructions are implemented by the execution of micro strings or micro programs. Certain automatic functions are implemented in circuitry such as program count up date, program fetching, interrupt sensing and memory interface control.

Program processing by micro instruction execution employ two program count registers and two program code buffer registers for macro instructions and micro instructions respectively. The transfer of micro program strings from the main memory to the micro program buffer registers will now be described in relation to FIG. 2. As illustrated therein, the macro programs or processes to be run reside in a portion of main memory, descriptors which reference or point to micro strings or micro routines resides in another portion of main memory as do the various micro routines themselves.

Figure 2:
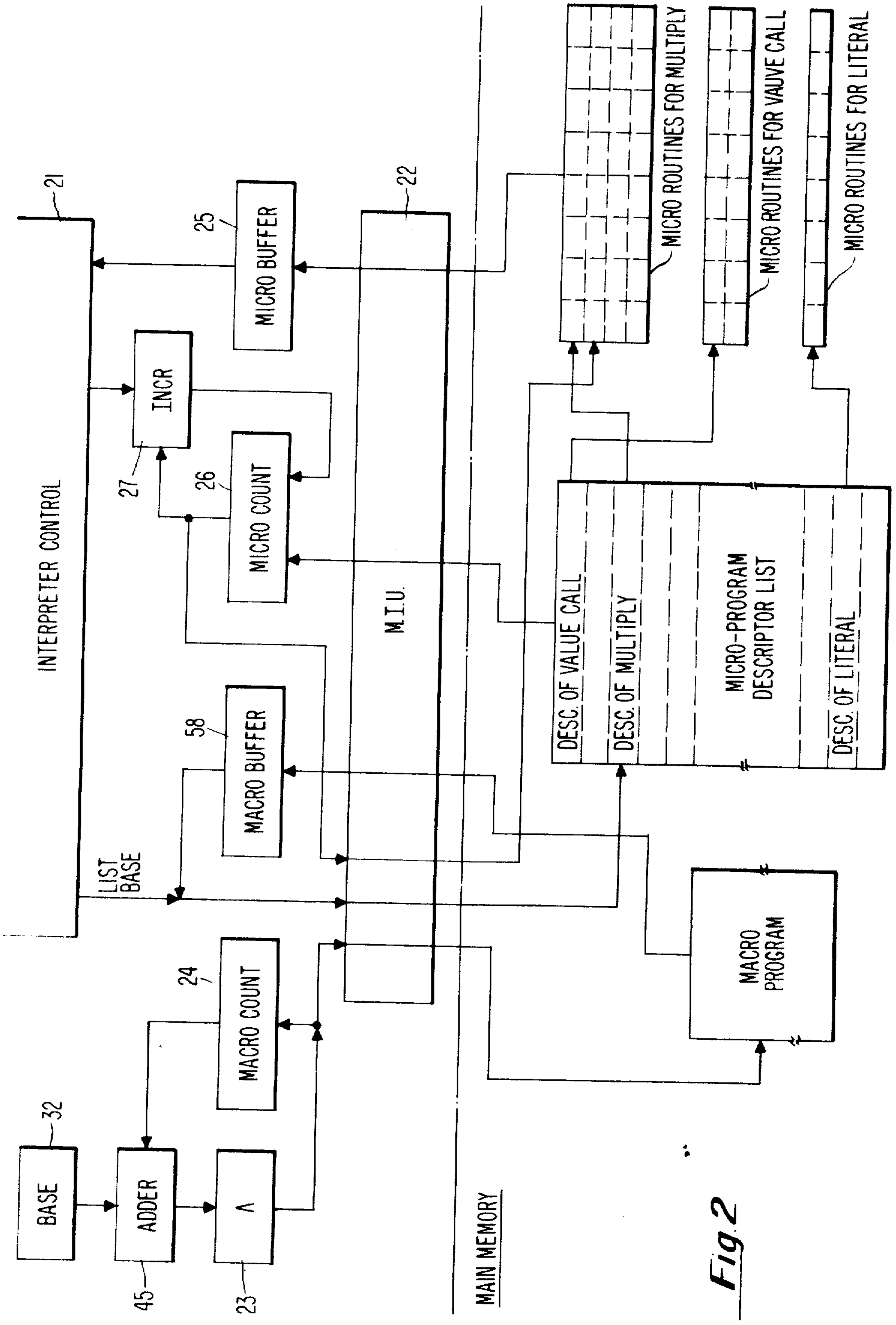
FIG. 2 is a diagrammatic representation of the relation between a memory and a processor as employed with the present invention.

As indicated above and as will be more thoroughly described below, nested processes and routines are referenced by base relative addresses or addresses relative to the initial address of a parent structure. The structures thus described in FIG. 2 are retrieved and executed according to sequence which will now be described. The absolute address of the most significant bit of the next operator in the program or process is created by adding the base address of its parent structure to the macro count in macro count register 24 and this absolute address is employed to fetch an operator syllable from the program portion of main memory into data buffer 58 by way of memory interface unit 22 (which will be more thoroughly described below). The operator syllable is then used as a relative address into the list of descriptors of micro programs or routines. An absolute address is formed using the operator syllable plus the base address of the descriptor list. This second absolute address is then employed to fetch from main memory the corresponding descriptor which defines the micro routine which will actually accomplish the functions specified by the macro operator. This descriptor is brought into the micro count register 26 and employed as a main memory address to fetch micro routine syllables referenced by that descriptor. Eight-8 bit micro routine syllables are then fetched from main memory and brought into micro buffer registers 25 and are executed serially.

The micro count is up-dated after each 8 bit micro routine syllable is executed, by incrementor 27, and the count is used to indicate a current micro routine syllable. After eight such syllables (a command word) have been executed, the micro count, which was up-dated after each execution, is used as a main memory address to fetch the next command word or micro routine syllable. A micro routine concludes with an explicit END command in the micro routine.

The macro count in macro count register 24 is now up-dated explicitly by the micro routine, each of the micro routines being of varying lengths. The END command in the micro routine returns control to create an absolute memory address of the next operator in the macro program.

Interpreter processor 10, then, is designed to provide the processing control for the system by means of structure operators specifically designed for efficient management of data and program structures, and by means of program operators selected to allow easy implementation of higher level languages. The control information is distributed, as required, to the arithmetic unit and through the memory interface unit 22 to the memory module.

While the main memory or level-1 memory is adapted to appear to the system as being free field or without structure, the various processes and information segments stored therein will, of course, be structured. Descriptors are provided to designate or point to the various information structures in memory, and also describe such structures as well as their significance in relation to the process in which they reside or to the parent process if the structure itself is a subprocess.

Figure 4:
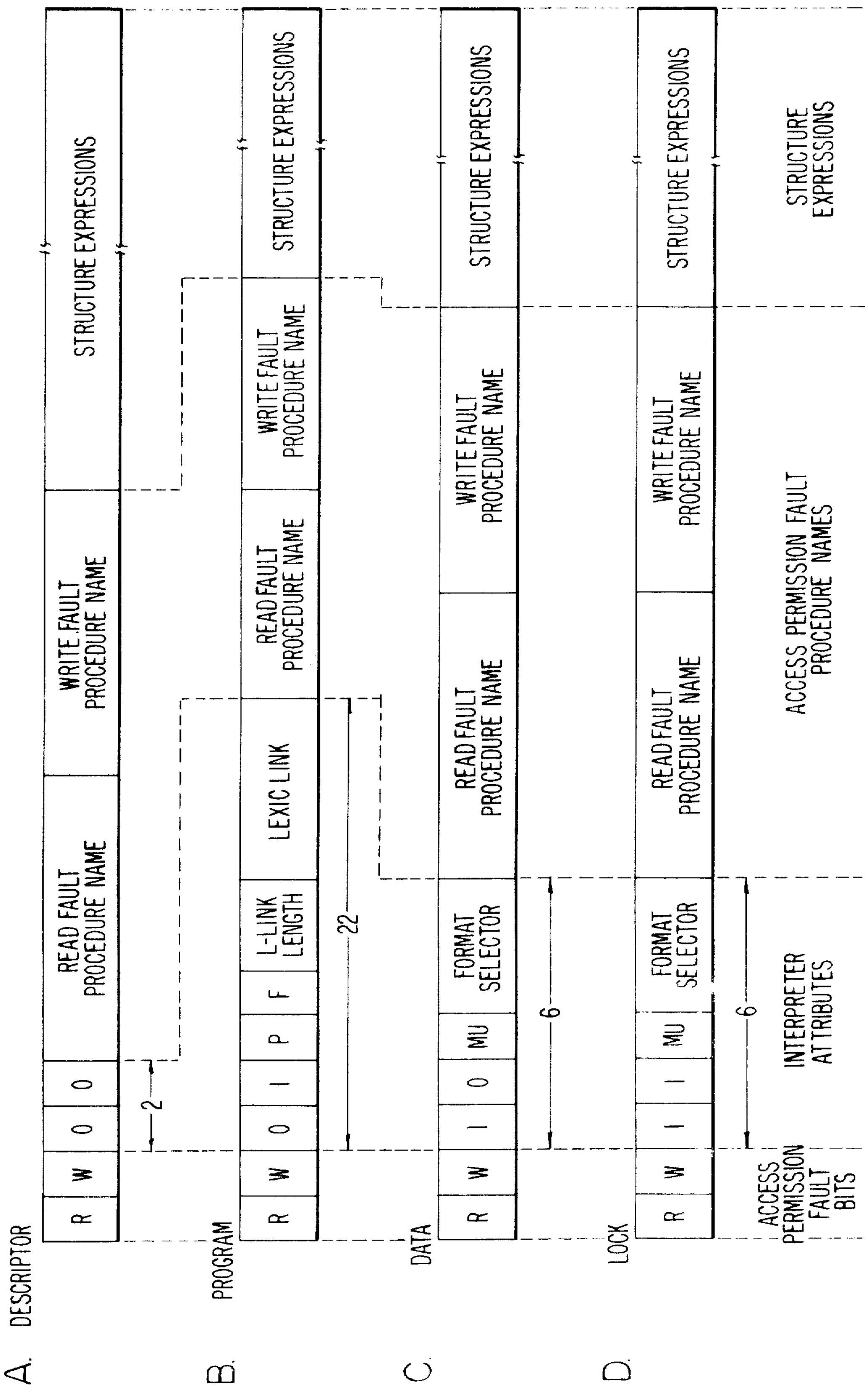
FIG. 4 is a representation of descriptor formats as employed with the present invention.

In this sense, accessing of all structured information in the various levels of memory involves an evaluation of descriptors which evaluation is performed by interpreter processor 10. As illustrated in FIG. 4, there are four types of descriptor formats to respectively reference locked data fields, data objects, program segments or other descriptors.

Each of the descriptors contains three major information sets or expressions. These are referred to as the access attributes, interpreter attributes and structure expressions. The access attributes define protection capability and also specify whether an element referenced in memory can be stored or fetched. The interpreter attributes define the characteristics of that referenced element and the structure expression contains the type of structure within which the element resides and this defines the structure and structure parameter fields which give the parameters necessary for accessing that structure. It is to be noted in reference to FIG. 4, that each descriptor can contain as many structure expressions as are necessary to obtain a desired element.

DETAILED DESCRIPTION OF THE SYSTEM

A. Interpreter Processor

Figure 3A:
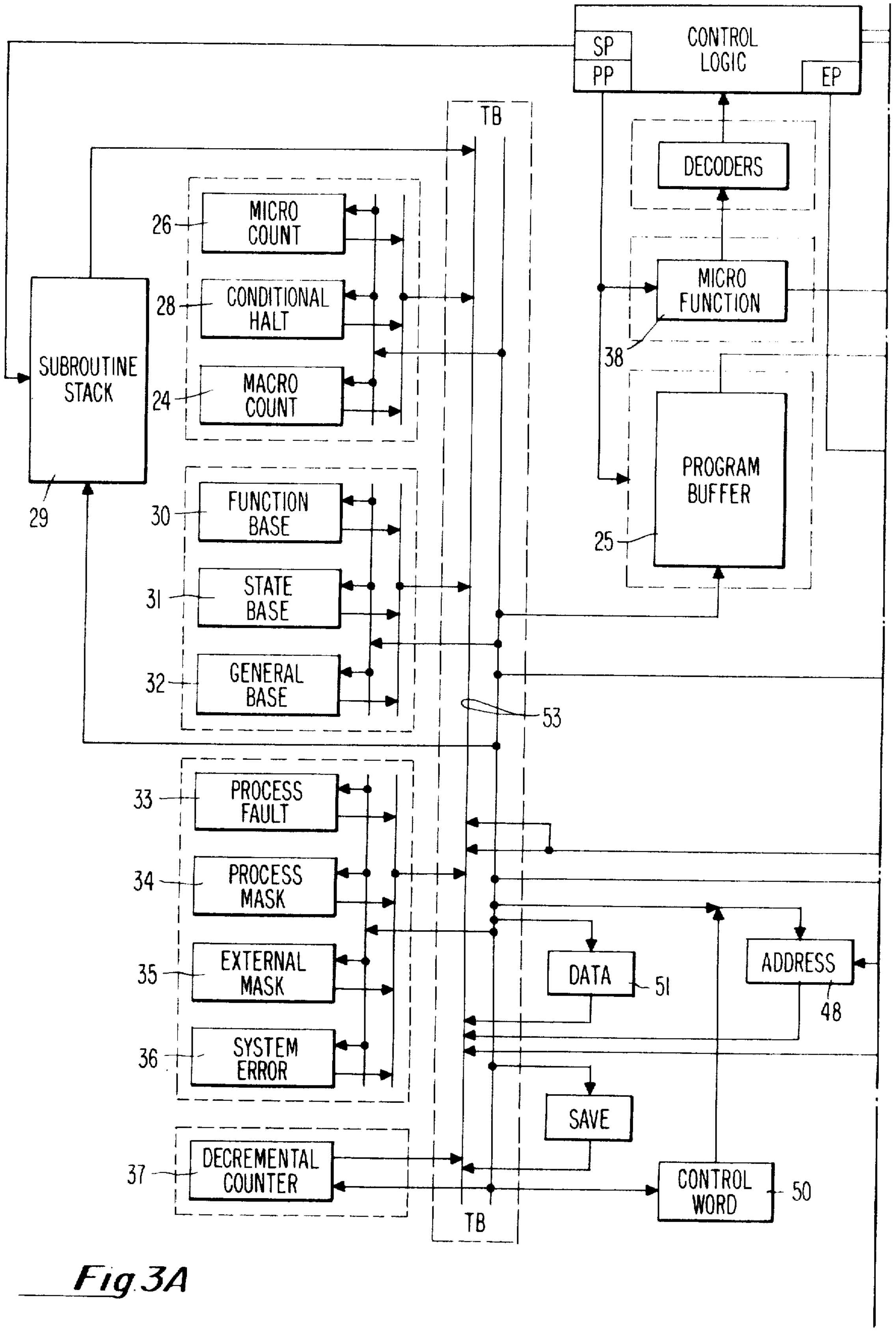
FIGS. 3A and 3B are schematic representations of the processor of the present invention.
Figures 3, 3B:
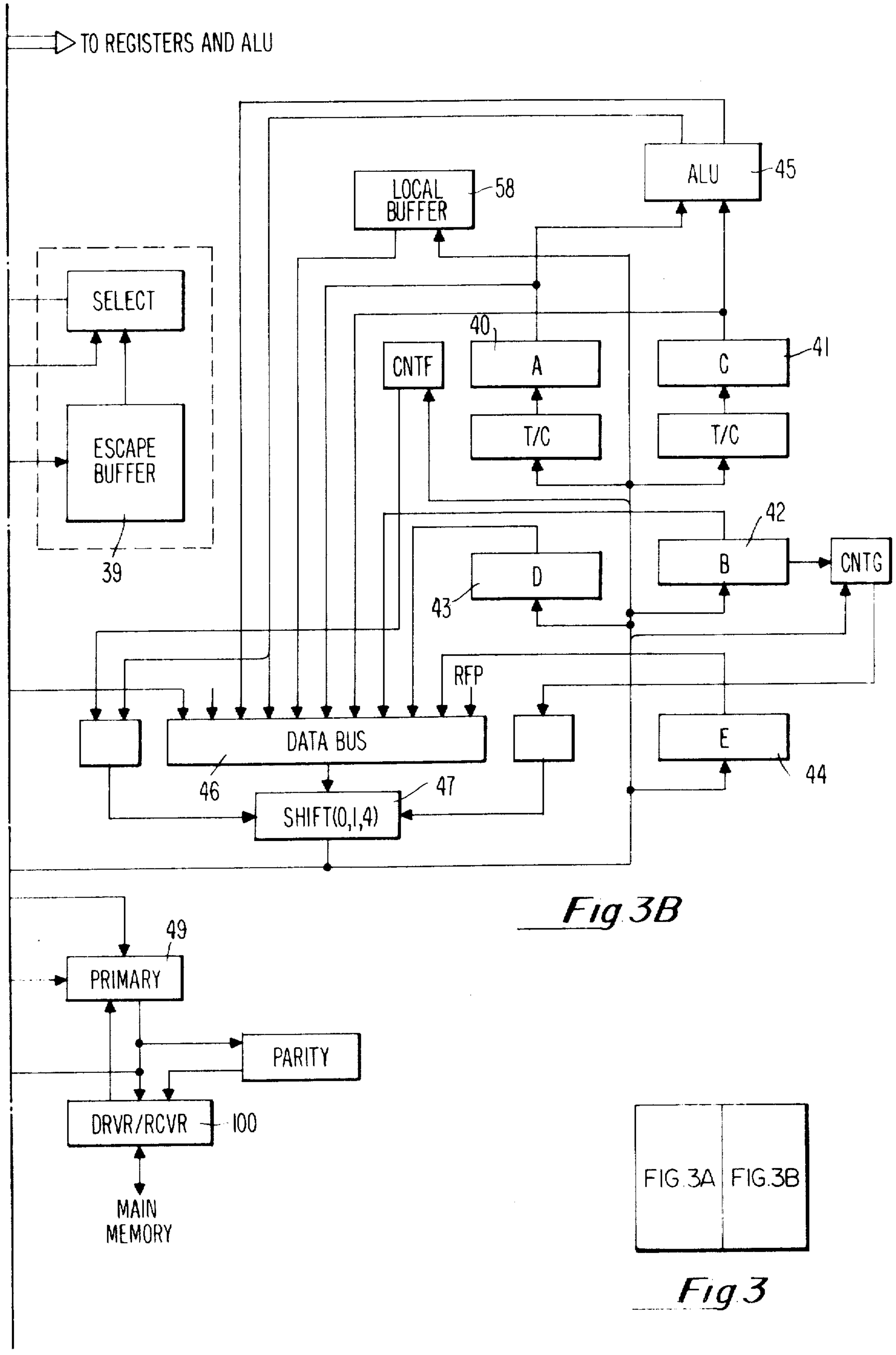
FIG. 3 is an illustration of the relation between FIGS. 3A and 3B.

The interpreter processor of the present invention is illustrated in FIG. 3. As shown therein, micro count register 26 is employed to keep track of the main memory address of the micro code currently being executed. The micro count is only updated when it is necessary to refill the local program buffer 25. Macro count register 24 is employed to record the main memory address of the normal program operation currently being executed. This count is updated programmatically by micro code associated with the macro operation. Conditional halt register 28 is employed to stop the computer when the conditional halt equals either the micro count or the macro count. The choice of which register to compare against is selected according to whether the processor is employed in normal operation or in conditional halt mode.

Subroutine stack 29 is a local buffer with 16 registers employed to nest absolute addresses of micro code exited by means of a return branch command. The information placed in the stack as a result of a branch command consists of a micro count, the program buffer word pointer and the program syllable pointer.

Function base register 30 is employed to indicate the base of a list of locations of micro code. It is intended to be used to implement indirect jumps as opposed to jumps directly to micro code. State base register 31 is employed to indicate the base of a list of descriptors in fields which describe the macro machine. The type of entry in the state list might be a name stack descriptor, a value stack descriptor and so forth. General base register 32 is employed as a general absolute main memory address and is usually a base address for often used values.

Process fault register 33 is employed to accumulate conditions which occur in the processor and in the system. System type faults such as memory errors are set automatically but process faults such as bonds violations are programmed in by micro code. Process mask register 34 is employed to determine if a fault should be responded to as a process fault or an external fault. This is a simple branch criteria and there is no circuit response to a fault. External mask register 35 is employed to determine if a fault should be responded to as an external fault. This register and process mask register 34 allow for any faults to be dealt with in two different ways. System error register 36 is employed to accumulate interrupts from other channels, such as the input-output system, other processors in the system, and the back up or level two memory. These interrupts are set automatically and are not masked.

Decremental timer 37 is a 30 bit counter which decrements at the clock rate and has its most significant 18 bits available for programmatic loading. When the most significant 18 bits are loaded, the remaining bits are set. All 30 bits are available for programmatic sampling.

Micro function register 38 is employed to hold the current micro command being executed. The micro function register is loaded from either the program buffer 25 or the escape buffer 39. Program buffer 25 is a 16 word by 64 bit local memory used in local tests of the micro program. The first eight words are used in normal operation as a micro code buffer. The buffer is loaded from the main memory automatically whenever necessary to replenish a program or when a branch in the micro code is executed. When the code is in the buffer, each word (64 bits) must end in a micro command so that no multiple micro commands may overlap a 64 bit local word. Escape buffer 39 is a 16 word by 64 bit local memory used as a read only memory which contains the micro code necessary to control the computer. The types of operations embedded in the escape buffer are the branch code and micro fetch.

A register 40 and C register 14 are the two main adder registers used in all computations and logical operations. B register 42, D register 43 and E register 44 are the three support registers of the adder section. These registers are used to hold operands for multiple operand instructions and for holding partial results. Arithmetic logic unit (ALU) 45 is a 32 bit wide logic system employed to provide addition, subtraction, comparisons and other logical operations.

Data bus 46 is a 32 bit wide series of controlled logic inputs employed as a distribution device for all registers in the adder section. Shift mechanism 47 is a 38 bit shifting mechanism built to allow left and right shifts of 0, 1, and 4 bits.

Communication address register 48 is a 64 bit register employed to hold the control word for main memory referencing. The location part and the length part of this register can be loaded separately. Communication primary register 49 is a 64 bit register employed to hold the data on main memory fetches and stores. This register is generally addressable by micro code for gathering the contents of the other registers for storage to or retrieval from the memory. Communications control register 50 is a special control register employed to implement the main memory order codes and to handle special events such as eight word references and main memory boundary problems. Communications data register 51 is a 64 bit general purpose register employed to manipulate data associated with the main memory references.

Information transfer to or from memory is by way of driver-receivers 57 which are actually a part of the memory interface unit (MIU) 22 as illustrated in FIG. 1 and which will be more thoroughly described below. Information transfer between driver-receivers 57 and the other registers in the processor are by way of transfer bus 53.

In addition to the program buffer 25, there is provided a local data buffer 58 which is a 16 word by 32 bit wide local storage device that may be employed as a stack mechanism, a random access scratch pad or a combination of both.

The processor has thus been described by which various macro programs are interpreted by strings of micro instructions or commands which are themselves stored in main memory and are retrieved and placed in program buffer 25 as required. The individual micro command syllables are sequentially presented to micro function register 38 from which they are decoded by decoders 54 to set the respective control logic 55 which conditions the various registers and the ALU so as to execute that command syllable. It will be remembered that micro command syllables can be received for execution from either program buffer 25 or escape buffer 39 the selection of which is made by select gates 81. Control logic 55 contains individual flip flops PP and EP which respectively point to either the program buffer or the escape buffer depending upon which contains the next micro command syllable to be executed. A subroutine pointer flip flop SP is also provided to indicate when a micro code address is to be selected from the subroutine stack 29 on a branch return.

In one embodiment, the program buffer is 16 words of high speed storage segmented into two sections, each have eight words. The width of the program buffer is 64 bits. The buffer is filled from main memory in eight word bursts taking full advantage of the FIU capabilities of bit addressability, interleaved stacks and phased control. An eight word section is filled automatically as the processor runs out of program sequentially or if a relative branch operator is executed. There is an option available that allows the programmer to use one section of the program buffer for normal execution and save the other eight word section for special routines, or all 16 words can be used for sequential execution. In the event of either of the aforementioned options the capability exists to programmatically branch to a particular point within the program buffer. The format of this operation which accomplishes this is an order code allowed by two 8 bit syllables which specify the word and syllable to go in terms of a program buffer address and syllable shift amount. These local branches can be unconditional or conditional on 14 separate states of the machine. Conditional local branching of course is a natural way of capturing tight loops and dropping through the loop on a given repetition count as for array processing.

Capturing eight words worth of special program in one section and running normal program out of the other section is convenient for capturing routines such as interrupt handling, local data test, etc. The program can branch into these routines and then return back to normal sequence without going to main memory for program. The subroutine mechanism recreates the program buffer state on return so that the local branches retain their integrety through various levels of nesting and unnesting.

The local data buffer is a sixteen word by twelve bit local high speed storage. The use of the data buffer is strictly a function of the program or more importantly, the programmer. There are no "hard wired" dedicated uses for the data buffer. The instructions provided with the data buffer allow it to be used as a random access memory or as a stack and it can be partitioned programmatically in any ratio. The entire buffer can be used as a stack or completely as a random access memory or any combination of the two. Generally the local buffer is used to hold repetitively used segments of information, such as address data to be calculated as described below.

Since shifting and alignment capabilities are available on the output of the local buffer, the buffer serves a natural purpose of holding the next higher level of language as in the case of emulation.

In the description of FIG. 2, it was pointed out that the various micro routines were fetched from memory by employing an address obtained from a micro routine descriptor. Such descriptors were in turn fetched from main memory by employing a macro operator syllable as a relative address which is combined with the base address of the descriptor list to form the absolute address for main memory. Such a base relative addressing technique is employed to specify not only the descriptors for the various micro routines but also to specify all data structures stored in main memory. Thus, an elemental data structure may be referenced by a descriptor containing a series of structure expressions such as was described in relation to FIG. 4 one of which specifies the initial address of that elemental data structure and a count of contiguous addresses to completely define the structure. The initial address, however, is specified relative to the initial address of a parent data structure as specified in the preceding structure expression. The initial parent structure address may be specified relative to some initial address of still another ancestor data structure contained in a preceding structure expression. In this manner, the entire address space in main memory may be thought of as a hierarchy of nested data structures. When it is desired to access a particular data structure, the various structure expressions within the descriptor for that structure are evaluated to obtain the absolute main memory address of the elemental structure and its length count. It will be understood that the processor of the present invention is adapted to access a free field memory in which may be stored a data structure of any specified number of bits which structure may be stored in the memory starting at any specified bit location. Thus, the absolute memory address and the length count must be computed and specified to the bit. The manner in which any word structure memory is adapted to appear to be a free field memory is described below.

B. Memory Modules

The primary function of memory modules 12 of FIG. 1 is to enable the requesting devices to extract fields of information or to insert fields of information any where within the memory system. A field of information is defined as any number of bits whose starting bit position may exist anywhere within the memory system. FIG. 1 shows the relationship of the memory modules 12 to the other devices in the system. There are three types of requesting devices: central processor modules 10, input/output module 18 and the memory extention controllers 14. The maximum number of memory modules that may be assigned to the system is preferable 16 and each memory module shall be capable of servicing any combination of a maximum of 16 requesting devices. The memory modules shall make no distinction between the requesting devices so that any operation performed for one requesting device can be performed for any other requesting device.

As indicated in FIG. 1, there are preferably 2 memory storage units 12 associated with each field isolation unit 13 to make up the complete memory module 11. However, in a particular system there may exist only one memory storage unit 12 with particular isolation unit 13. Each memory storage unit 12 will store information in a core memory stack although other forms of memory may be employed for the purpose of the present invention, and such unit shall have the capability of presenting this information upon request. Each memory storage unit 12 shall interface only with its own field isolation unit 13 so that all operations within the system shall first pass through a particular field isolation unit before being initiated.

Figure 6:
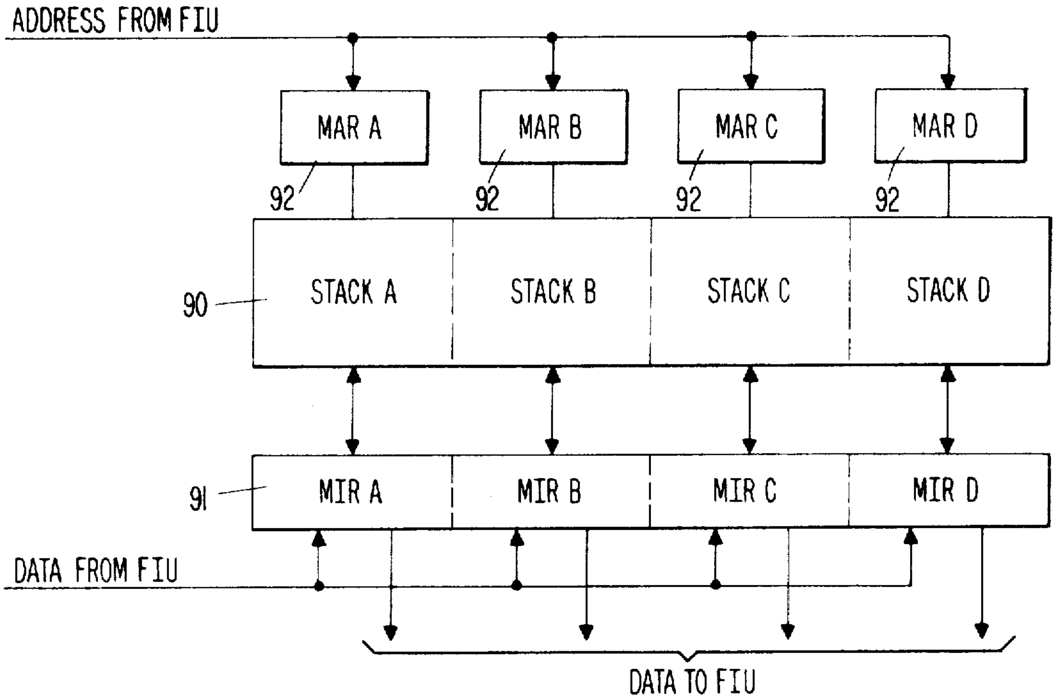
FIG. 6 is a schematic representation of a memory storage unit of FIG. 5.
Figure 5:
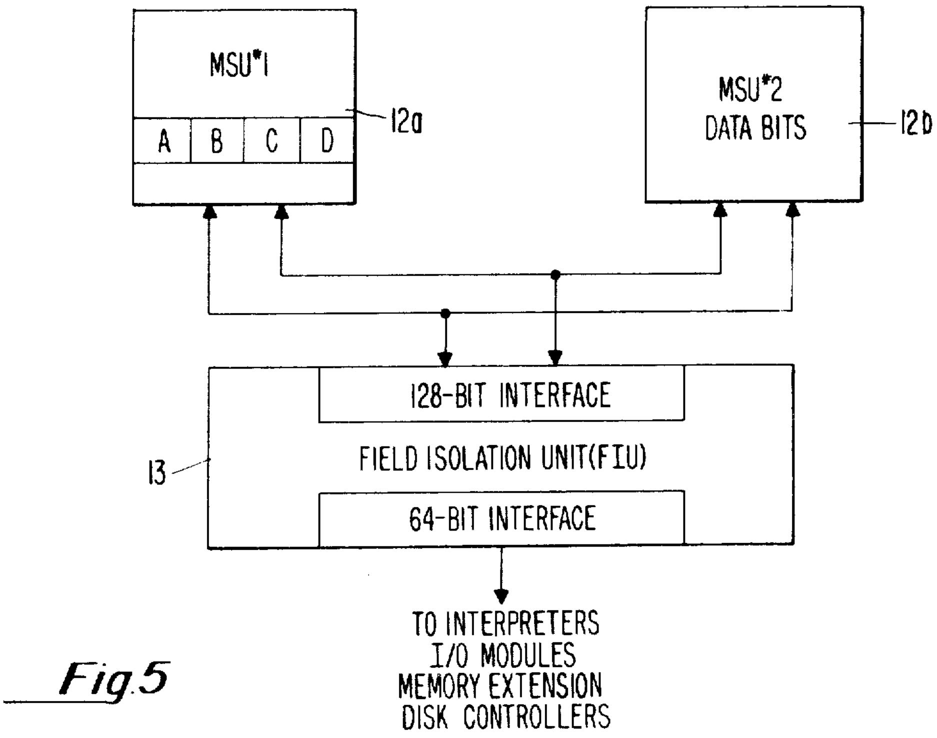
FIG. 5 is a schematic representation of a memory module of FIG. 1.

As indicated in FIGS. 5 and 6, each memory storage unit 12 is in fact structure oriented and divided into a plurality of stacks. Each memory stack is preferably made up of 8192 locations, each of which contain 288 available bits of information. Out of these 288 bits, 256 shall be used by the system as memory space and the remaining 32 bits shall be used internally as error code information. The error code bit shall pertain only to the preceding 64 bits of information. Whenever information is stored within the memory, these error code bits shall be set according to the new information in the stack word.

C. Field Isolation Unit

Each field isolation unit 13 is provided with logic which provides the capability of extracting or inserting fields of information independent of memory structure. The memory therefore shall be treated by the requesting device as one continuous space having the ability to accept fields starting at any point (bit) and continuing for any prescribed length.

Figures 7, 11, 12:
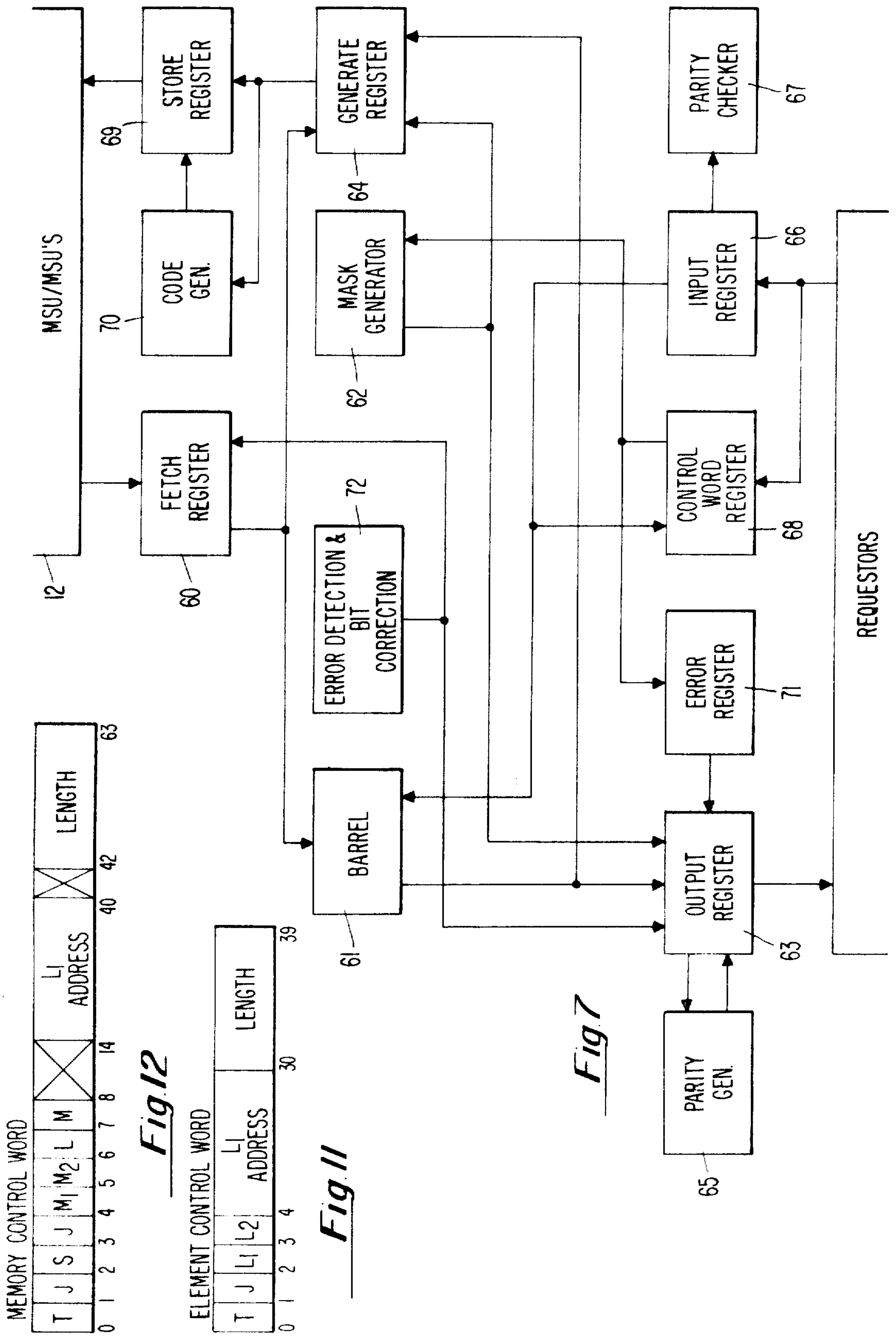
FIG. 7 is a schematic representation of a field isolation unit of FIG. 6.
FIG. 11 is a representation of the element control word format.
FIG. 12 is a representation of a memory control word format.

Field isolation unit 13 consists of 13 major functional components which are interconnected. As shown in FIG. 7, fetch register 60 is a 144-bit register to be used to contain a copy of 2 memory words. Thus, the first set of 72 bits is a copy of the memory word that contains the present starting bit of a field, and the second set of 72-bits is a copy of the memory word that contains the continuation of a field. For example, if an operation specifies the starting bit to be bit 5 in memory word B and the length is more than 59 bits, the fetch register 60 would receive words B and C. During a fetch operation, fetch register 60 is used to present memory words to barrel logic 61 for field extraction. During the store operation, fetch register 60 is used to reinsert bits of a memory word which were not changed by the storing of a new field.

Barrel section 61 is a shifting network which has the capacity of shifting 128 bits of information left-end-around 0 to 127 bit locations. During a fetch operation, barrel 61 is used to position the field so that the field is left justified or right justified before being transferred to the requesting device. During a store operation, barrel 61 is used to position the incoming data into the proper bit location of memory. Mask generator 61 provides the facilities for selecting a field from the barrel output circuitry and transfering the field into the output register 63 or into generate register 64. The selected field is determined by the starting bit and length field information provided in the control word and, also, by the type of operation requested. A disclosure of a particular shifting network which may be employed in the present invention is contained in Stokes et al. U.S. Pat. application Ser. No. 789,886, filed Jan. 8, 1969 and assigned to assignee of the present invention.

Output register 63 is a 65-bit register and will be used to buffer information during a minimum of one clock period which information is transferred to the requesting device from the various logic circuits in the field isolation unit.

Parity generator 65 is employed to generate parity for all outgoing data words. A parity bit shall follow the data transmission by one clock period.

Input register 66 is a 65 bit register to be used to hold the control word for a parity check. Also, input register 66 will provide temporary buffering during a minimum of one clock period for data transfer from the requesting device.

Parity checker 67 is provided to check all incoming data words. A parity bit shall be received one clock period after the data transmission.

Control word register 68 is a 64 bit register to be used to contain the control word transmitted by the requesting device. While an operation is in progress, this register shall keep track of the exact starting position and the remaining field length of that operation.

Generate register 64 is a 128 bit register and is used to combine the barrel section output with the fetch register output; the result is a memory word. Also, generate register 64 shall hold the memory word for a minimum of one clock period to enable the code generator to develop check code bits before the word is transferred into the store register.

Store register 69 is a 72 bit register and is used to provide temporary storage for data word which is to be stored at a location specified by the proper memory address register 92 of FIG. 6.

Code generator 70 is provided to develop check bits for all information that will be stored in memory. The development of these check bits will establish a means of detecting bit failures during data transfer between the field isolation unit 13 and memory 12.

Error register 71 is a 64 bit register and is used to contain all pertinent information necessary to identify and define a failure, such as, external failure (failure caused by the requesting device), internal failure (failure detected within the field isolation unit logic) and memory storage failure (failure due to incorrect stack information).

When words are received from fetch register 60, they contain a total of 72 bits each. The 64 most significant bits are data bits and the remaining 8 bits are check code bits. These check code bits allow the detector and bit correction section 72 to detect 1 bit error or a 2 bit error. If a 1 bit error occurs, the bit will be corrected before the field is transmitted. If a 2 bit error occurs, no correction is possible. In either case the requesting device will be notified of the failure and what type error occured.

D. Memory - FIU Interface

Figure 8:
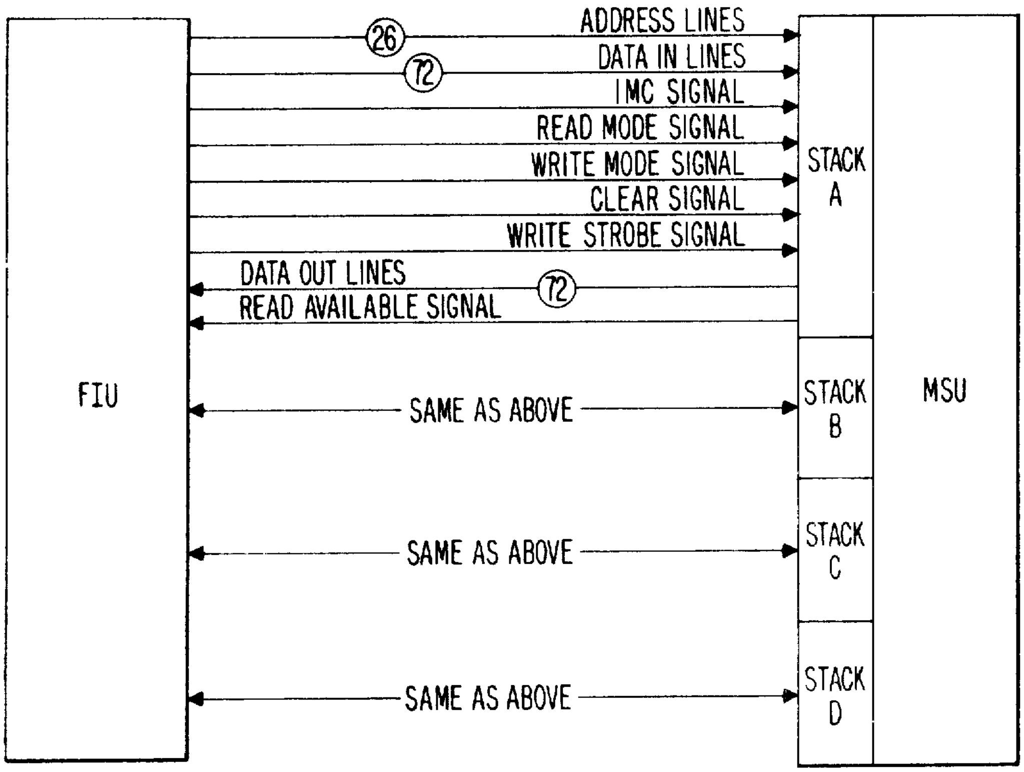
FIG. 8 is a representation of the interface between a memory storage unit and a field isolation unit.

Having thus described both the respective memory storage unit 12 and the field isolation unit 13, the interface between these two units will now be described in reference to FIG. 8. This interface includes control lines, address lines and data lines. As illustrated in FIG. 8, the interface is repetitious in the sense that the same types of transmission lines are presented to each of the respective four stacks in which each of the memory storage units 12 is organized as was discussed in relation to FIGS. 5 and 6.

As illustrated in FIG. 8, the interface to stack A includes 26 address lines which are used to transfer a 13 bit address that may specify one of the 8,192 memory locations. Interface for addressing contains 26 lines since the memory storage unit 12 required one and zero digits for each address bit.

There are 72 data-in lines which are used to transfer data information that is to be inserted into an addressed memory location. Correspondingly, there are 72 data-out lines which are used to transfer a copy of the contents (72 bits) read from the addressed memory location to the field isolation unit.

The remaining control lines include the IMC line which provides the signal to initiate the memory cycle and a read mode signal line which is employed to enable the transfer of data from an addressed memory location to the memory information register 91 as illustrated in FIG. 6. The write mode signal is employed to enable the transfer of data from FIU 13 to memory information register 91. Clear signal is employed to clear the memory information register prior to data insertion. The write strobe signal is employed to strobe data into the memory information register 91 which makes it available to an addressed location. Read available signal is employed to inform the field isolation unit 13 that data read from the addressed memory location is present in memory information register 91.

E. Requestor - FIU Interface

The interface between field isolation unit 13 and each of the respective requestors is illustrated in FIG.

9 and includes a 64 bit information bus which is bidirectional and employed to transfer both data and control words. The bus is bidirectional in that the information may be transferred either from the field isolation unit to the requestor or from the requestor to the field isolation unit. A minimum of one clock period of dead time is required between consecutive operations whenever the situation is reversed.

Figure 9:
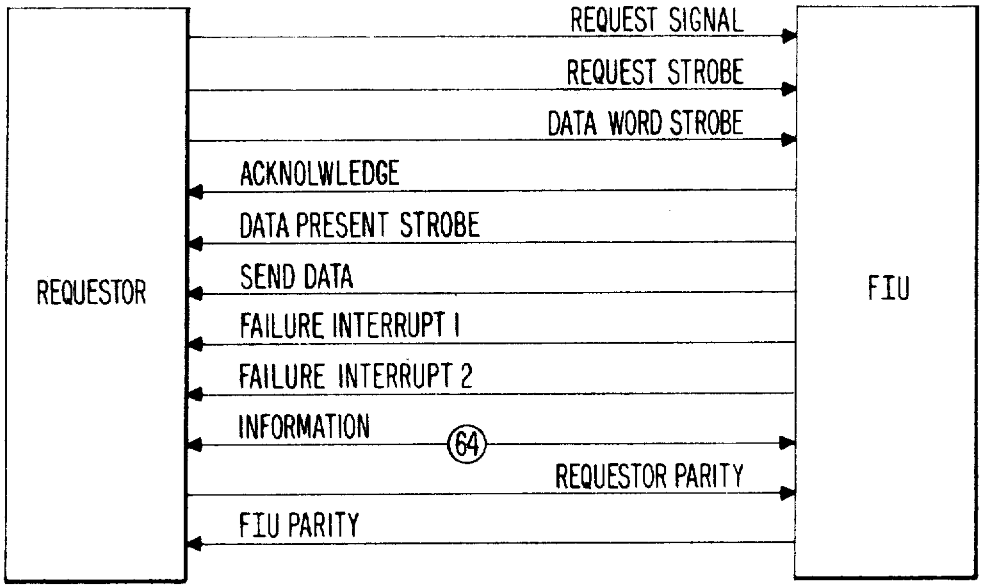
FIG. 9 is a representation of an interface between a field isolation unit and a requesting device.

The control lines as illustrated in FIG. 9 include a request signal which supplies a request signal sent by the requestor to select a specific field isolation unit. It must go true one clock period preceding the request strobe and remain true until the first acknowledged signal is received from the field isolation unit. A request strobe signal is sent to inform the field isolation unit that a control word is being transmitted over the information line. Initially, the request strobe goes true one clock period after the request signal goes true and will remain true for one clock period before the control word is sent over the information line. It must remain true until a first acknowledged signal is received for any fetch operation or any store operation the field length of which is greater than 64 bits. The request strobe must be true for one clock period and proceed each transmission of the control word by one clock period for any strobe whose field length is equal to or less than 64 bits.

A data strobe signal is sent to inform the field isolation unit that a data word is to be transmitted over the information line. If the field length of the data word is greater than 64 bits, the data word strobe signal will follow the "send data signal." If the field length of the data word is equal to or less than 64 bits, the data word strobe signal will be sent automatically after the request strobe signal and will be one clock period in duration.

An acknowledge signal of one single clock period pulse is always transmitted to the requestor when service of the requestor is initiated. The requestor, however, must realize that the reception of the first acknowledge does not guarantee the operation will be performed.

A data presence strobe is sent to inform the requestor that a data word is present in input register 66 of the field isolation unit (see FIG. 7). The data presence signal is transmitted in coincidence with the data word for all fetch operations as long as no errors are detected in the read outs from the memory storage unit 12. It should be noted that the data present strobe is not the same as the data word strobe transmitted by the requestor. The data present strobe indicates a valid data word has been transmitted from the field isolation unit.

A send data signal is sent to the requestor whenever the field length of any store operation is greater than 64 bits. Each clock period that the send data signal is true, indicates to the requestor that it must send a data word strobe before it sends a data word. This method of control is necessary to eliminate the need of the requestor to know whether the field isolation unit has a minimum or a maximum memory storage unit configuration.

Failure interrupt one signal informs the requestor that at least one of the following types of errors have been detected by the field isolation unit. The failure interrupt signal is two clocks in duration and is sent to the requesting device that initiated the operation. The types of errors are: two bit error in read out from the memory storage unit, parity error in the control word, illegal operation code in the control word, wrong field isolation unit address in the control word, incorrect number of data word strobes in a store operation, parity error in the requestor data word and internal error.

Failure interrupt two signal informs the requestor that the field isolation unit has detected a 1 bit error in a read out from the memory storage unit. The failure interrupt two signal is two clocks in duration and is sent to the requesting device that initiated the operation.

The requestor parity line is used to transfer the delayed parity bit for any requestor transmission to the field isolation unit. The delayed parity bit lists always follow the transmitted word by one clock period and must be a minimum of one clock period in width.

F. Processor Memory Interface Unit

Figure 10:
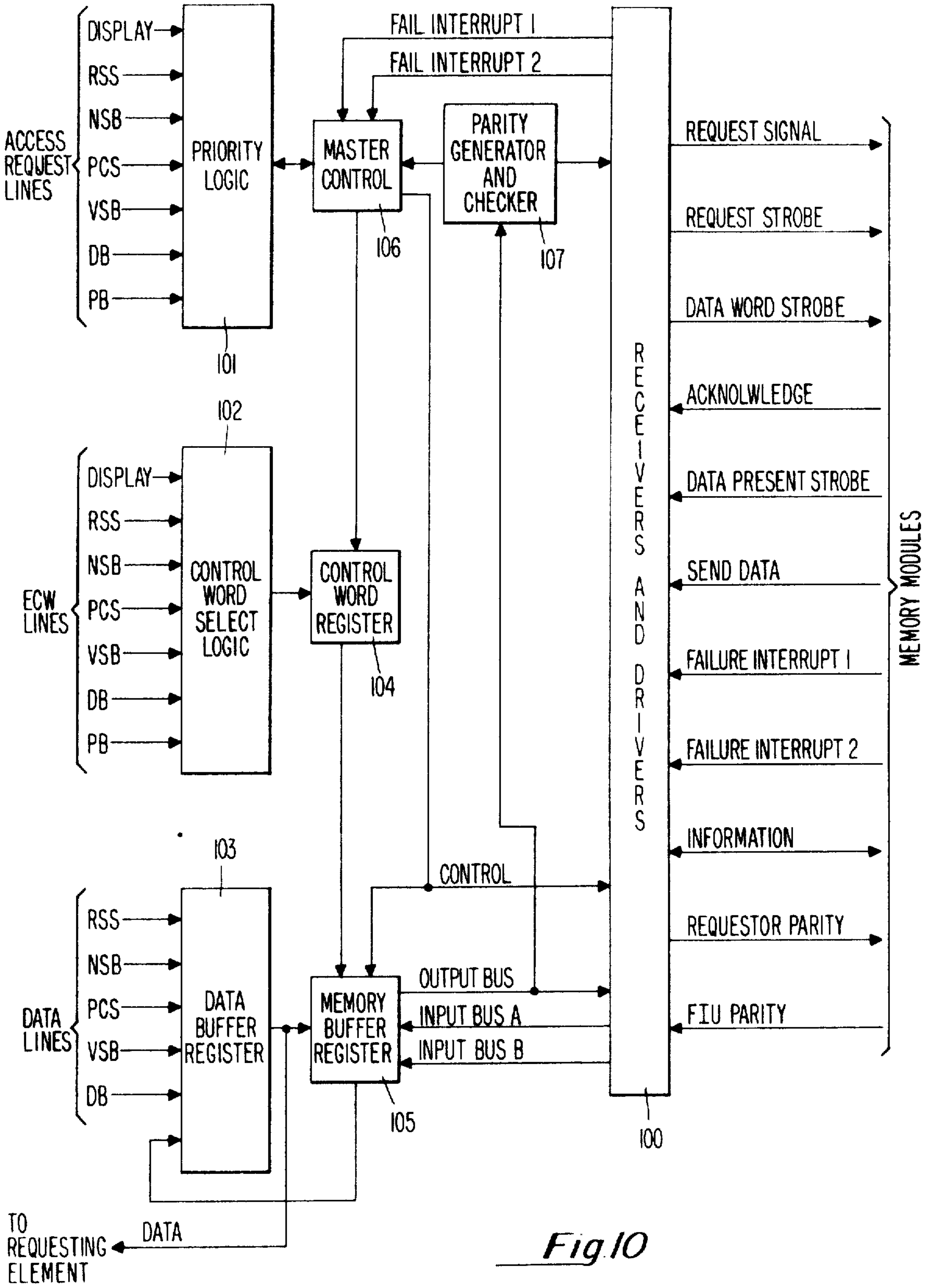
FIG. 10 is a schematic representation of the memory interface unit of a processor of FIG. 2.

The requestor side of the requestor-field isolation unit interface will now be described with relation to FIG. 10. It will be remembered that the field isolation unit can receive and transmit data or control words to any requestor be it a processor, and I/O control unit or the memory extension controller for the level-2 store. However, in FIG. 10, the circuitry illustrated is that which is particularly adapted for a processing unit. Thus the circuitry of FIG. 10 represents the memory interface unit 22 as illustrated in FIG. 2 and 3.

Memory interface unit 22 (MIU) performs all transfers between the processor and any of up to a maximum of 16 memory modules 11. The MIU handles all data transfers as field-oriented operations and shall manage the memory access requests by the functional elements of the processor on a preassigned priority basis.

When one of the functional elements of processor 10 requires the services of MIU 22, it shall be required to raise its "access request" line to the MIU and place an element control word (ECW) as illustrated in FIG. 11 on a corresponding ECW line. Each of the respective ECW lines from the respective elements are supplied to control word select logic 102 as illustrated in FIG. 10. When requesting element has priority, the MIU shall load the element control word into its control word register 104 and determine which of the following operations is specified: a single word (field length less than 64 bits) store operation, a multiple word (field length greater than 64 bits) store operation, or a fetch operation.

G. Control Word Format

Referring briefly to FIG. 11, the various fields of the unit control word ECW are defined as follows: type T bit which identifies the service request as a fetch or store operation; justification J bit which identifies the justification required of a single word fetch or store operation where a right justification represents that the least significant bit transferred is placed in the least significant bit position and left justification represents the opposite positioning; lock L bits which identify the type of fetch operation to be performed (i.e., whether or not the field that has been transferred shall be locked). It is the responsibility of the requesting element to know the state of the field it is requesting.

The L1 address field identifies the absolute level-1 storage starting bit position involved in the transfer. The length fields specifies the total length of the field being transferred in bits.

Upon determining the type of operation requested, the MIU shall construct a memory control word MCW of a format illustrated in FIG. 12.

If a single word store operation was specified, the MIU shall raise its request lines to the specified memory module, and then alternately transmit the MCW and the data to be stored to the addressed memory module. MIU 22 shall continue to transmit the MCW followed by the data to be stored until an acknowledged signal is received from the memory module.

If a multiple word store operation is specified the MIU shall raise its request lines to the applicable memory module and then send the MCW to the memory module. When the memory module acknowledges the presence of the MCW, the MIU will commence the data transfer under the control of the data request signal.

If a fetch operation is specified, the MIU shall raise its request lines and send the MCW to the applicable memory module. When the memory module acknowledges the presence of the MCW, the MIU shall enable its information bus receiver circuits. Information from the memory will now be accepted by the MIU. However, the memory shall be required to transmit to the MIU a data present strobe pulse to cause the information present on the information bus to be transferred to and detected by the requesting element. The data present strobe pulse shall be required for each word transferred from memory to the data requesting element.

If either a fetch or store operation requires the involvement of more than one memory module, the MIU shall be required to construct an MCW for each memory module involved. In this case, the MIU shall construct an updated MCW, and then initiate and conclude the data transfer with the second memory module. If the six least significant bits of the L1 address field in the original MCW were all zeros the updated MCW shall be required to have modified L1 address field which points to the first position of the new memory module and a new length field which reflects the number of bits remaining to be transferred. If the six least significant bits of the original L1 address field are not equal to zero the updated MCW shall be required to have its link L bit set, A modified L1 address field is created whose six least significant digits are identical to those in the original MCW, bits 18 through 33 shall be all ones, bits 14–17 shall reflect the new memory module number, and the modified length field which shall reflect the number of words remaining to be transferred plus 1, which is required to reflect the length operation required of the memory.

The various fields of memory control word (MCW) will now be defined with reference to FIG. 12. The T and J, bits as well as the L1 address field and the length field are the same in the MCW as they were in the element control word ECW of FIG. 11. In addition, the modifier bits M1 and M2 are the same as defined for the lock L bits in the ECW.

The specifier S bit identifies a store operation as either a single word store ($S=1$) or multiple word store ($S=0$) operation. This bit also identifies a fetch operation which is requesting that the memory fail register be read and then cleared ($S=1$).

The length L bit, when present, indicates that the field being transferred is contained in more than one memory module and that its starting memory address was not the beginning of a memory word boundary (zero or a multiple of 64). This bit is required to be in a true state only when fetching or storing a field across a memory boundary and more than one memory module is involved in the transfer. When this situation arises, the length bit must be in the true state when the up-dated MCW is sent to the second memory module.

The mode M bit indicates when present that the memory shall be operated in a defined pattern (e.g., one word every two clocks) as controlled by the memory.

As indicated in FIG. 10, the memory interface unit includes 9 functional components which will now be described.

Priority logic 101 is responsible for granting the services of the MIU to the highest priority requesting element. Control word select logic 102 is responsible for the routing of the element control word ECW of the requesting element to control word register 104 in accordance with priority logic 101. Control word register is a 64 bit register and is used to store the ECW during its execution and up dating by master control section 106. This latter section 106 contains the control logic necessary to execute all MIU operations, including the controls required to complete the receiver and driver paths. Memory buffer register 105 is a 64 bit register and is used to buffer all input and output data to and from the memory via the information interface. Data buffer register 103 is a 64 bit register and is used to buffer all data transfers between the requesting element of the processor and the MIU. This register shall also be used for length transfer operations which necessitate the combining of data fields as has been described above. Parity generator and checker 107 is required to generate parity for all words being transferred to memory and to check the parity of words being fetched from memory. Receivers and drivers 100 include 16 discrete groups of receiver and driver circuits in the MIU, one group per memory module interface. The state of these groups shall be determined by master control 106 and only one group shall be active at any one time.

Processor error register (PER, not shown in FIG. 10) is a 64 bit register and will be used to facilitate recovery from error conditions involving level-1 references by capturing all available control information relating to the reference causing the interrupt. The PER can be programmatically brought to the top of the value stack. Once the PER is loaded with error information, it cannot be loaded again until it is cleared; clearing the PER is done by fetching it. The PER is never loaded unless an actual interrupt is going to occur.

There are two types of errors involved in transfer across the memory interface unit. They are the MIU detected errors and the memory detected errors. One such MIU-detected error is that of no access to memory. This error condition shall be declared if the MIU receives no response from the requested memory module for a period of 25 micro seconds. No response from memory shall be declared if an acknowledge signal is not received from the memory module or when complete data is not transferred by a memory module.

The second MIU detected error is that of disparity. This error condition shall be declared if a fetch of data from memory is received by the MIU with incorrect parity or if data transfer from the interpreter portion of the processor is received by the MIU with incorrect parity. If a no access to memory or parity error is detected, the processor error register shall be loaded as was described above.

There shall be two classifications of memory-detected errors which will be reported to the MIU; uncorrectable and correctable errors. These two types of errors shall be reported to the MIU as fail interrupt one signal and fail interrupt two signal respectively; however, the MIU shall send only one fail signal to the interpreter portion of the processor.

Fail interrupt one signal (uncorrectable error condition), if recorded by the memory module while an MIU operation is in progress, causes the MIU operation to be terminated and the processor notified of this action. If the error is reported during the time when an MIU operation is not in progress with the reporting memory module, the MIU shall record the failure but it will complete the current operation.

Fail interrupt two signal (correctable error condition) is a type of error signal which shall cause the MIU to notify the processor of the condition, and the operator shall proceed as usual.

With the system thus described, the memory control word presented to the isolation unit shall be stored in control word register 68 as illustrated in FIG. 7. This control word will contain the absolute address of the starting bit of the field to be stored or fetched and the length of the field. From this information, the absolute addresses of a word location containing the starting bit and its next contiguous word location are generated and sent to the memory address registers 92 (see FIG. 6). During a fetch operation, the selected field is shifted by barrel section 61 from its particular bit location as existed in fetch register 60 so that the first bit of the selected field will reside at the first bit position in output register 63. Should the field length overlap more than two contiguous word locations, control register 68 will then generate the addresses of the next pair of contiguous word locations to fetch the remaining bits necessary to complete the field which bits will again be shifted out of fetch register 60 to appropriate bit locations in output register 63 so that the information transfer to the requesting device will be a sequence of 64 bit words with the last word of the sequence having as its first set of bits those bits necessary to complete the field with the remaining bits being zero.

During a store operation, the information in the control register will again specify the absolute address of the starting bit in memory where the field is to be stored plus the length of the field from which the absolute address of the respective pair of contiguous word locations can be calculated. This field will be transferred from the requesting device as a sequence of 64 bit words the number of which will be that necessary to transfer the particular field. Again, the control word register will keep track of the bits that have been transferred and will generate new pairs of memory addresses as required to complete the storage of the field.

In both store and fetch operations, it will be remembered that should the select field overlap a pair of adjacent memory storage units, then the memory interface unit of the requesting device shall generate new memory control words to be sent to the next adjacent memory storage unit. In this manner, fields of any desired length can be stored in the array of memory modules which will appear to the requesting device as being free field or free of structure.

While particular embodiments of the present invention have been described and illustrated, it will be apparent to those skilled in the art that changes and modifications may be made therein without departure from the spirit and scope of the invention as claimed.

What is claimed is:

1. An information processing system comprising:

a random access structured memory;

accessing means coupled to said memory to store or fetch information segments of any specified number of bits in length which segments are to be stored or fetched from a location beginning at any particular bit location; and a processor including;

a control unit to be activated by the decoding of different micro instructions;

a micro instruction decoder unit coupled to said control unit to receive and decode individual micro instructions; and a set of micro program storage registers coupled to said decoder unit and to said accessing means to receive strings of micro instructions for sequential transfer to said micro decoder unit.

2. A system according to claim 1 wherein said processor includes:

a micro location register to hold the memory address of the initial micro instruction of a string of micro instructions currently being executed;

a descriptor base register to hold the location of the initial descriptor of a string of descriptors stored in memory which descriptors contain the addresses of corresponding initial micro instructions of respective strings of micro instructions, the contents of which descriptor base register are to be added to a fetched macro instruction to create the absolute address of the corresponding descriptor; and memory addressing means to effect an addressing of said memory in accordance with one of said addresses.

3. A processor according to claim 2 wherein:

said memory addressing means includes a set of fixed registers coupled to said decoder unit, which registers hold micro instructions to effect said memory addressing.

4. A processor according to claim 1 including:

a set of fixed registers coupled to said decoder unit which registers hold micro instructions to effect memory addressing.

5. A processor according to claim 1 including:

a micro location register to hold the memory address of the initial micro instruction of a string of micro instructions; and a set of registers arranged to form a stack in which the first entry stored is the last entry fetched which stack is coupled to said micro location register to receive a micro instruction address therefrom when a micro instruction decoding effects a branch in the micro program by said control unit.

6. A processor according to claim 1 including:

a plurality of data registers to hold operands required for the execution of the respective micro instructions.

7. An information processing system comprising:

a random access structured memory;

accessing means coupled to said memory to store or fetch information segments of any specified number of bits in length which segments are to be stored or fetched from a location beginning at any particular bit location; and a processor including:

a control unit to be activated by the decoding of different micro instructions; and a micro instruction decoder unit coupled to said control unit and to said accessing means to receive and decode individual micro instructions.

8. An information processing system according to claim 7 wherein:

said accessing means includes control means to receive a control word specifying a structure location in which resides the first bit position of said information segment.

9. An information processing system according to claim 8 wherein:

said control means includes circuitry to up-date the control word as portions of said segment are transferred to or from the memory.

10. An information processing system according to claim 7 wherein said accessing means includes:

an information register coupled to said memory to receive the contents for two contiguous structure locations; and insertion-extraction means coupled to said information register to insert or extract said information segment starting at any particular bit location within a portion of said information register.

11. An information processing system according to claim 10 including:

masking means coupled to said information register to prevent entry into specific bit locations of said information register that are not specified by a control word to receive information bits.

12. In an information processing system having a memory to store macro instructions and micro instructions; a processor for said system comprising:

a control unit to be activated by the decoding of different micro instructions;

a micro instruction decoder unit coupled to said control unit to receive and decode individual micro instructions;

a set of micro program buffer registers coupled to said decode unit and to said memory to receive strings of micro instructions from said memory for sequential transfer to said micro decoder unit;

a micro location register to hold the memory address of the initial micro instruction of a string of micro instructions currently being executed;

a descriptor base register to hold the location of the initial descriptor of a string of descriptors stored in memory which descriptors contain the addresses of corresponding initial micro instructions of respective strings of micro instructions, the contents of which descriptor base register are to be added to a fetched macro instruction to create the absolute address of the corresponding descriptor; and memory addressing means to effect an addressing of said memory in accordance with one of said addresses.

13. A processor according to claim 12 wherein:

said memory addressing means includes a set of fixed registers coupled to said decoder unit, which registers hold micro instructions to effect said memory addressing.

14. In an information processing system having a memory to store macro instructions and micro instructions; a processor for said system comprising:

a control unit to be activated by the decoding of different micro instructions;

a micro instruction decoder unit coupled to said control unit to receive and decode individual micro instructions;

a set of micro program buffer registers coupled to said decoder unit and to said memory to receive strings of micro instructions from said memory for sequential transfer to said micro decoder unit;

a descriptor base register to hold the location of the initial descriptor of a string of descriptors stored in memory which descriptors contain the addresses of corresponding initial micro instructions of respective strings of micro instructions, the contents of which descriptor base register are to be added to a fetched macro instruction to create the absolute address of the corresponding descriptor; and memory addressing means to effect an addressing of said memory in accordance with one of said addresses.

15. A processor according to claim 14 including:

a set of fixed registers coupled to said decoder unit which registers hold micro instructions to effect memory addressing.

16. A processor according to claim 14 including:

a micro location register to hold the memory address of the initial micro instruction of a string of micro instructions; and a set of registers arranged to form a stack in which the first entry stored is the last entry fetched which stack is coupled to said micro location register to receive a micro instruction address therefrom when a micro instruction decoding effects a branch in the micro program by said control unit.

17. A processor according to claim 16 including:

a plurality of data registers to hold operands required for the execution of the respective micro instructions.

18. In an information processing system having a memory to store macro instructions and micro instructions, a control unit, a micro instruction decoder coupled to said control unit and a set of buffer registers coupled to said decoder and said memory; the method comprising:

fetching a macro instruction from said memory;

forming a memory address from said macro instruction, at which address resides a descriptor specifying the address of the initial micro instruction of a string of micro instructions;

fetching said descriptor from memory; and fetching at least a portion of said string of micro instructions from memory for storage in said set of buffer registers.

19. A method according to claim 18 including:

transferring said micro instructions, one at a time in sequence, from said buffer registers to said decoder.

* * * * *